Aug. 5, 1924.
O. W. HOWARD
DISK PLOW
Filed Sept. 16, 1922
1,504,046
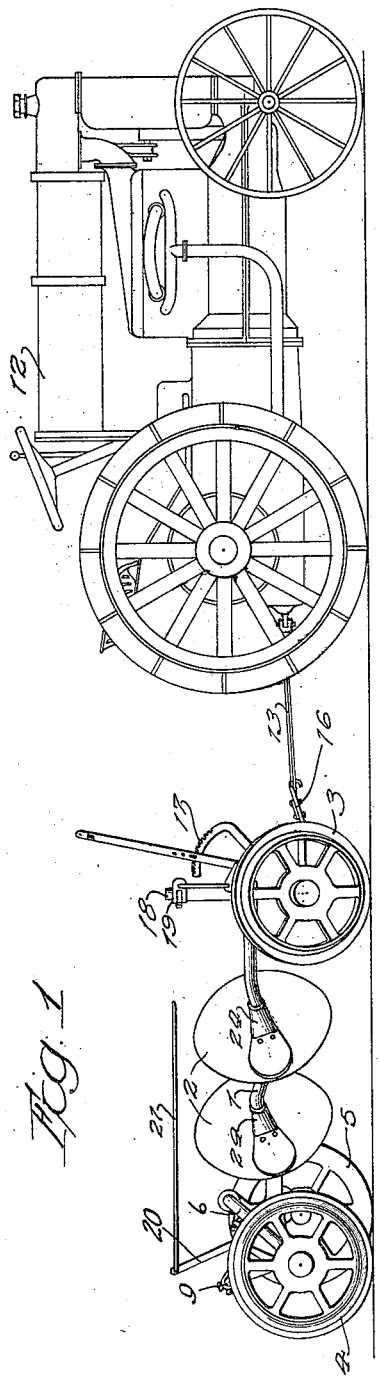
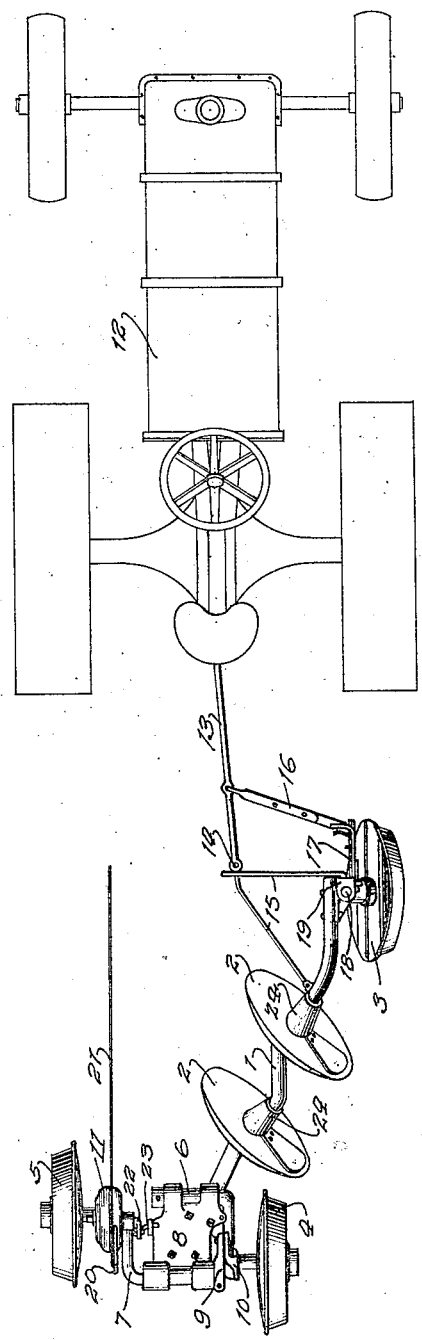
Inventor:
Otis W. Howard
by L. C. Shonts
Atty Patented Aug. 5, 1924.

1,504,046

UNITED STATES PATENT OFFICE.

OTIS W. HOWARD, OF MOLINE, ILLINOIS, ASSIGNOR TO MOLINE PLOW COMPANY, INCORPORATED, OF MOLINE, ILLINOIS, A CORPORATION OF VIRGINIA.

DISK PLOW.

Application filed September 16, 1922. Serial No. 588,701.

*To all whom it may concern:*

Be it known that I, OTIS W. HOWARD, a citizen of the United States, residing at Moline, county of Rock Island, State of Illinois, have invented certain new and useful Improvements in Disk Plows, of which the following is a specification.

The invention relates to disk plows.

The general object of the invention is to provide an improved disk plow.

A more specific object of the invention is to provide an improved mounting for the disks of a disk plow.

Other objects and advantages will appear from the specification and drawings.

An embodiment of the invention is shown in the accompanying drawings in which.

Figure 1 is a side elevation of the disk plow showing it connected to a tractor.

Figure 2 is a plan view.

The plow comprises, in general, a beam 1 carrying plowing disks 2, the front end of the beam being carried by a front furrow wheel 3 and the rear end being supported by a rear furrow wheel 4 and a land wheel 5. The rear furrow wheel 4 is carried on a crank axle 6 and the land wheel 5 is mounted on a crank axle 7, the two crank axles being journaled in the frame 8 and connected together by means of the arms 9 and 10. A powerlift mechanism 11 is provided for swinging the crank axles to raise and lower the plow.

The plow is connected to a tractor 12 of conventional type by means of the draft bar 13 pivoted at the point 14 to a draft frame 15 connected to the front end of the beam 1. The draft bar 13 is also connected by a link 16 with an arm 17 fixed to the axle 18, upon which the front furrow wheel is mounted. The axle 18 is journaled in the bearing 19 so that it may swing about a vertical axis. This draft connection, not only serves to transmit the draft of the tractor to the disk plow, but it also guides the front furrow wheel whenever the tractor is turned.

The powerlift mechanism which is contained within the casing illustrated is described in detail in the application of Joseph E. Boda, Serial No. 535,130, filed February 9, 1922, to which reference is made for details. In general, it comprises a clutch, one member of which is driven continuously by the land wheel and the other member of which is driven intermittently from the first whenever the two are connected together by tripping the lever 20 by means of the cord 21 extending forward to the tractor. The second member of the clutch operates a crank 22 connected by a link 23 with the frame 8. When the crank 22 is moved through one cycle, it swings the crank axle 7 downwardly, as viewed in Figure 2, to raise the plow and when it is moved through its other cycle of movement, it swings the crank axle upwardly to lower the plow.

It has heretofore been the practice to mount the plowing disks 2 upon suitable brackets or arms carried by the main plow beam. These brackets and the bearings must be firmly attached to the beam, must extend outwardly far enough to permit the disks to clear the beam, and must be provided with several adjustments, so that the plowing disks may be set in numerous working positions.

The present invention is directed principally to the provision of a mounting for the disks which does away with the necessity of the brackets or arms and greatly simplifies the disk mountings, at the same time retaining all the desired features of adjustment.

The result is accomplished by mounting the disks directly on the beam as illustrated in the drawings. The beam 1 is preferably bent as illustrated so that the disks will be in the desired position, but it is to be understood that the beam need not be bent in this way unless desired. Each disk is mounted on an adjustable bearing 24, which is slid over and fixed on the beam 1. The disks 2 are adjustable on the bearings through the medium of a ball and socket adjustment, so that they may be angled about a vertical or a horizontal axis. This permits the disks to be set in any desired plowing position.

This construction greatly simplifies and reduces the expense of a disk plow of this type without lessening its efficiency. It provides a plow that is neater looking, weighs less, costs less, and operates satisfactorily.

It is to be understood that the construction shown is for purposes of illustration only and that variations may be made in it without departing from the spirit and scope of the invention as defined by the claims.

I claim:

1. A frameless disk plow having a diagonally located beam, a front furrow wheel connected directly to the front end of the beam, crank axles carrying respectively a rear furrow wheel and a rear land wheel for supporting the rear end of the beam, power-lift mechanism for swinging the crank axles to raise and lower the beam, and plowing disks mounted directly on the beam with their axes substantially coincident with the axis of the beam.

2. A frameless disk plow having a diagonally located beam, a front furrow wheel connected directly to the front end of the beam, crank axles carrying respectively a rear furrow wheel and a rear land wheel for supporting the rear end of the beam, power-lift mechanism for swinging the crank axles to raise and lower the beam, said beam being bent to provide offset portions, and plowing disks mounted directly on the offset portions with the axes of the disk coincident with the respective axes of the portions of the beam on which the disks are mounted.

In testimony whereof, I affix my signature.

OTIS W. HOWARD.